(12) United States Patent
Casas

(10) Patent No.: US 6,374,953 B1
(45) Date of Patent: Apr. 23, 2002

(54) VERTICAL PLUNGER BRAKE CONTROL DEVICE

(76) Inventor: Alan V. Casas, P.O. Box 327, Lake Isabella, CA (US) 93240

( * ) Notice: Subject to any disclaimer, the term of this patent is extended or adjusted under 35 U.S.C. 154(b) by 0 days.

(21) Appl. No.: 09/451,099

(22) Filed: Nov. 30, 1999

(51) Int. Cl.[7] ............................. B66B 5/00; F16D 51/04
(52) U.S. Cl. ...................... 187/399; 187/377; 187/314; 188/79.57; 188/75
(58) Field of Search ................................. 187/394, 399, 187/298, 314, 350, 377; 188/79.57, 75, 196 M, 171, 216

(56) References Cited

U.S. PATENT DOCUMENTS

| | | | | |
|---|---|---|---|---|
| 848,373 | A | * | 3/1907 | Ihlder et al. ............ 187/379 X |
| 1,443,841 | A | * | 1/1923 | Gudmundson ............. 187/377 |
| 1,902,640 | A | * | 3/1933 | Halfvarson ................. 188/171 |
| 4,116,308 | A | * | 9/1978 | Sever .......................... 188/171 |
| 5,899,304 | A | * | 5/1999 | Daugherty .................. 188/171 |
| 5,971,109 | A | * | 10/1999 | Aulanko et al. ........ 187/350 X |
| 6,179,090 | B1 | * | 1/2001 | Casas .......................... 187/377 |

* cited by examiner

Primary Examiner—Dean J. Kramer
Assistant Examiner—Thuy V. Tran
(74) Attorney, Agent, or Firm—Robert M. Sperry

(57) ABSTRACT

Improved apparatus for manually releasing and controlling an elevator hoist brake having a solenoid with a vertically-actuated, flanged plunger operable to drive the brake shoes apart in opposition to brake springs which normally urge the brake shoes into the locking position, said apparatus comprising a bar having one end insertable between said solenoid and the flange of said plunger and engageable therewith, a handle having an enlarged portion projecting downwardly adjacent the forward end which is pivotally secured to said bar at a point spaced from said one end of said bar, a lever pivotally attached to said bar and having a forward end located adjacent said one end of said bar and dimensioned to be insertable between said solenoid and said flange of said plunger and engageable therewith, a link member pivotally connected to said bar at a point spaced from the forward end of said link and from said one end of said bar and having said forward end of said link pivotally connected adjacent the rear end of said lever, said link being formed with a longitudinal slot adjacent the rear end of said link member, and a bolt fixedly secured to said handle and extending through said slot of said link member whereby vertical movement of said handle will cause opposite vertical movement of said forward end of said lever to force said plunger outwardly from said solenoid.

14 Claims, 4 Drawing Sheets

VERTICAL PLUNGER BRAKE CONTROL DEVICE

FIELD OF INVENTION

This invention relates to manual control devices for elevators and the like and is particularly directed to means for manually controlling the brake of a vertical plunger elevator.

PRIOR ART

As is well known, passenger elevators are typically raised or lowered by a cable which runs over a pulley located at the top of the elevator shaft. The elevator car is attached to one end of the cable, while a counterweight, equal to the weight of the elevator car plus several passengers, is attached to the opposite end of the cable. The car and counterweight run up and down the shaft on guide rails and an electric motor, needing only enough power to raise the difference in weight between the car and the counterweight, drives the pulley to move the car. When the car is stopped, for example, at a desired floor, a hoist brake acts to hold the car at the desired location. The hoist brake is typically urged into the locking position by springs and is released by a solenoid. Many prior art elevator brakes employ solenoids which have horizontal brake actuating plungers, which are urged outwardly by heavy springs to force the brake shoes into the licking position, while the solenoid acts to pull the plungers inwardly to release the brake. A device for manually controlling these horizontal plunger brake devices is disclosed in my copending patent application Ser. No. 08/753,190, filed Nov. 21, 1996. However, many other elevator brakes employ vertical solenoids having generally T-shaped plungers which drive a pair of rocker arms to force pivotally mounted brake shoes apart to release the brake, while strong springs normally urge the brake shoes toward each other to clamp the brake therebetween and, hence, to retain the elevator in a given position. The present invention enables an operator to manually control these vertical plunger brakes. A power outage often serves to set the brake to safely lock the car wherever it is within the elevator shaft until power is restored. Unfortunately, electrical or power failure prompting this emergency braking action often results in passengers being trapped in the elevator car at a location between floors until rescue personnel can open the shaft doors and reach the elevator car by ropes or ladders or moving another elevator car along side to remove the trapped passengers. However, this involves considerable time and risk for the passengers. Furthermore, such time-consuming rescues require a plurality of rescue personnel and demand that the passengers crawl through a trap door onto the roof of the elevator car in order to reach the ropes or ladders or an adjacent elevator car. However, this may be difficult or impossible for some passengers, especially those who are obese, elderly or handicapped. More importantly, in natural emergencies, it may be a considerable time before a sufficient number of rescue personnel are available to effect such rescues, which are time consuming in themselves. Obviously, the longer the wait for rescue, the greater is the peril from fire, smoke and aftershocks. Furthermore, where the power outage has been caused by an earthquake, there is danger or aftershocks which may dislodge chunks of concrete or other structural material within the elevator shaft, causing increased danger to both the rescuers and to the evacuating passengers. Clearly, it would be desirable to provide apparatus which would enable a single individual to effect a controlled release of the hoist brake to facilitate prompt rescue of trapped passengers. Apparatus for accomplishing one man release and control of elevator hoist brakes have been proposed heretofore. However, prior art elevator hoist brake release devices serve to fully release the elevator brake, allowing the car to "drift" uncontrollably and at constantly increasing speeds, which are difficult to stop and which actually increase the danger to the passengers. Thus, none of the prior art elevator brake release devices have been entirely satisfactory.

BRIEF SUMMARY AND OBJECTS OF INVENTION

These disadvantages of the prior art are overcome with the present invention and an improved elevator hoist brake control device is proposed for use on elevators having vertical plunger solenoids which device is simple and inexpensive to produce and purchase, yet which enables a single individual to quickly and easily release an elevator hoist brake in a controlled manner to permit safely "drifting" the elevator car in a controlled, constant and predictable manner to an adjacent floor to allow trapped passenger to escape.

The advantages of the present invention are preferably attained by providing improved apparatus for manually releasing and controlling an elevator hoist brake having a solenoid with a vertically-actuated, flanged plunger operable to drive the brake shoes apart in opposition to brake springs which normally urge the brake shoes into the locking position, said apparatus comprising a bar having one end insertable between said solenoid and the flange of said plunger and engageable therewith, a handle having an enlarged portion projecting downwardly adjacent the forward end which is pivotally secured to said bar at a point spaced from said one end of said bar, a lever pivotally attached to said bar and having a forward end located adjacent said one end of said bar and dimensioned to be insertable between said solenoid and said flange of said plunger and engageable therewith, a link member pivotally connected to said bar at a point spaced from the forward end of said link and from said one end of said bar and having said forward end of said link pivotally connected adjacent the rear end of said lever, said link being formed with a longitudinal slot adjacent the rear end of said link member, and a bolt fixedly secured to said handle and extending through said slot of said link member whereby vertical movement of said handle will cause opposite vertical movement of said forward end of said lever to force said plunger outwardly from said solenoid.

Accordingly, it is an object of the present invention to provide an improved device for controlling elevator hoist brakes.

Another object of the present invention is to provide an improved elevator hoist brake control device for use on elevators having vertical plunger solenoids.

A further object of the present invention is to provide an improved elevator hoist brake for use on elevators having vertical plunger solenoids which device is simple and inexpensive to produce and purchase.

Another object of the present invention is to provide an improved elevator hoist brake control device for use on elevators having vertical plunger solenoids which enables a single individual to quickly and easily release said elevator hoist brake in a controlled manner to permit safely "drifting" the elevator car in a controlled, constant and predictable manner to an adjacent floor to allow trapped passenger to escape.

A specific object of the present invention is to provide improved apparatus for manually releasing and controlling an elevator hoist brake having a solenoid with a vertically-actuated, flanged plunger operable to drive the brake shoes apart in opposition to brake springs which normally urge the brake shoes into the locking position, said apparatus comprising a bar having one end insertable between said solenoid and the flange of said plunger and engageable therewith, a handle having an enlarged portion projecting downwardly adjacent the forward end which is pivotally secured to said bar at a point spaced from said one end of said bar, a lever pivotally attached to said bar and having a forward end located adjacent said one end of said bar and dimensioned to be insertable between said solenoid and said flange of said plunger and engageable therewith, a link member pivotally connected to said bar at a point spaced from the forward end of said link and from said one end of said bar and having said forward end of said link pivotally connected adjacent the rear end of said lever, said link being formed with a longitudinal slot adjacent the rear end of said link member, and a bolt fixedly secured to said handle and extending through said slot of said link member whereby vertical movement of said handle will cause opposite vertical movement of said forward end of said lever to force said plunger outwardly from said solenoid.

These and other objects and features of the present invention will be apparent from the following detailed description, taken with reference to the figures of the accompanying drawing.

DETAILED DESCRIPTION OF THE INVENTION

Figure 1:
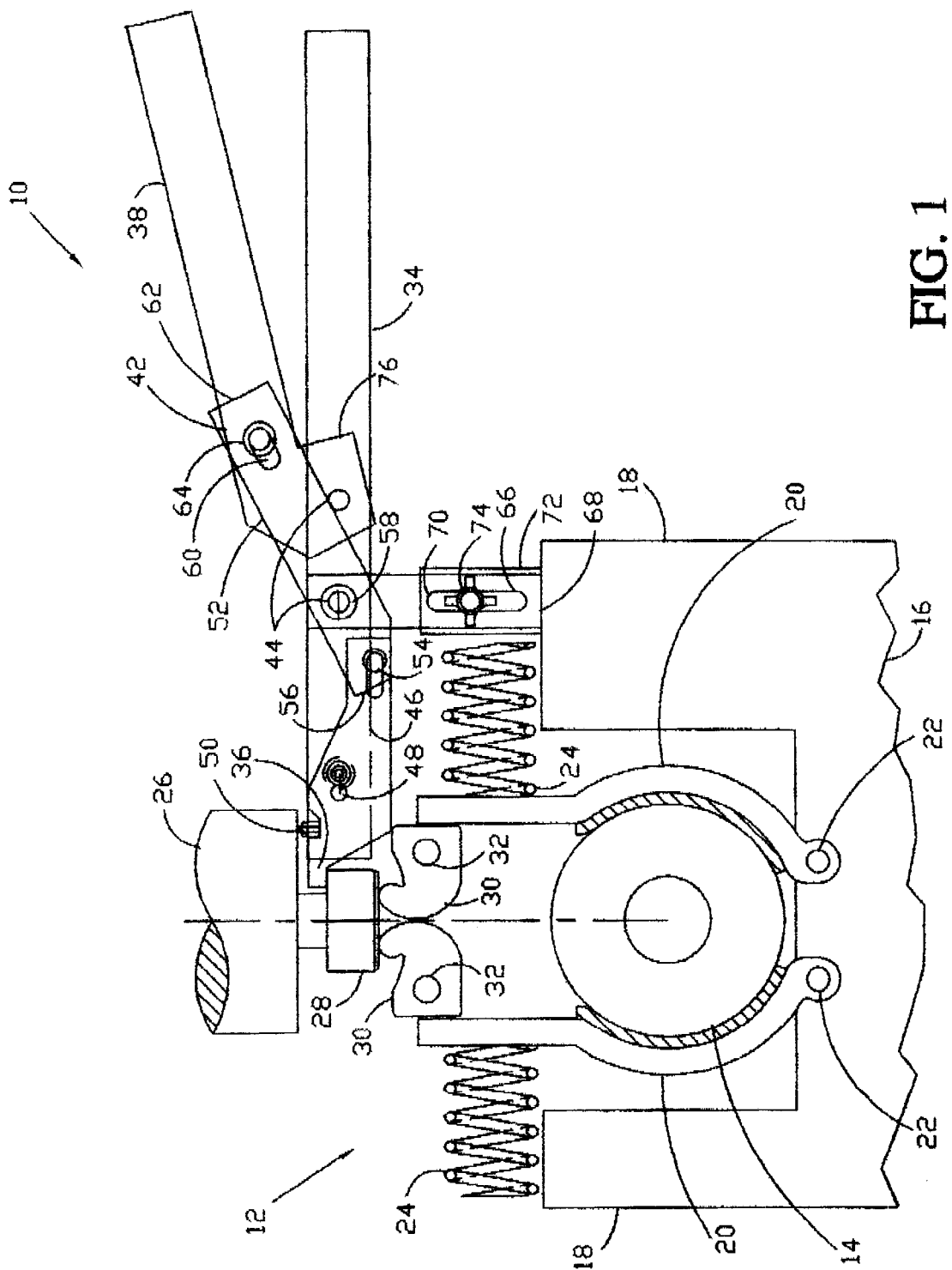
FIG. 1 is a side view showing the device of the present invention positioned to control an elevator having a vertical plunger solenoid.
Figure 3:
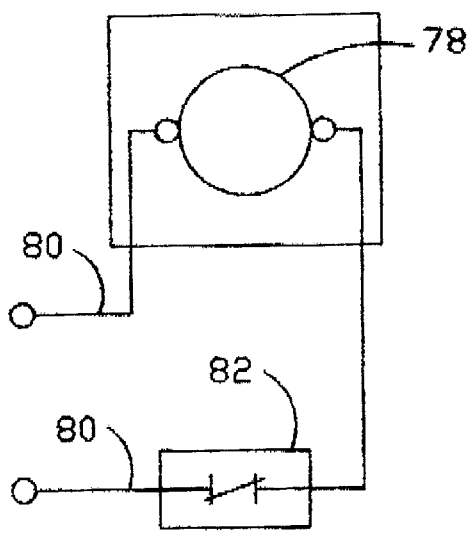
FIG. 3 is a diagrammatic representation showing an audio-visual indicator system for use with the hoist control device of the present invention to indicate the position of the elevator car.

In that form of the present invention chosen for illustration, FIG. 1 shows an elevator hoist control device embodying the present invention, indicated generally at 10, positioned to control a vertical plunger elevator hoist brake, indicated generally at 12. As shown, the elevator hoist brake 12 comprises a an elevator hoist drum 14 which is mounted on a column 16 having pillars 18 which support the mechanism of the hoist brake 12. The hoist brake 12 has a pair of shoes 20 which are pivotally mounted on the column 16, as seen at 22, and which are normally urged into engagement with the hoist drum 14 by strong springs 24 to prevent undesired rotation of the drum 14 and, hence, to prevent undesired movement of the elevator, not shown. To allow intentional rotation of the hoist drum 14, and, thus, to permit desired movement of the elevator, a solenoid is mounted above the hoist drum 14 and has a plunger 28 which is movable vertically and serves to drive rockers 30, which are pivoted at 32, to force the brake shoes 20 to outwardly, against the urging of springs 24 and, hence, to release the hoist drum 14 for rotation to move the elevator. The hoist control device 10 comprises a bar 34 having one end 36 which is insertable between the solenoid 26 and the flange of the plunger 28. A handle 38 has an enlarged portion 40 projecting downwardly adjacent its forward end 42 which is pivotally secured to the bar 34 at a point 44 spaced from the forward end 36 of the bar 34. A lever 46 is pivotally attached to the bar 34, as seen at 48, and has forward end 50 located adjacent end 36 of the 34 and dimensioned to be inserted between the solenoid 26 and plunger 28. A link member 52 is pivotally connected to the bar 34 at a point 58, spaced from the forward end 56 of the link 52 and from end 36 of the bar 34, and has the forward end 56 of link 52 pivotally connected adjacent the rear end of lever 46, as seen at 54. The link 52 is formed with a longitudinal slot 60 located adjacent the rear end 62 of the link member 52 and a bolt 64 is fixedly secured to the handle 38 and extends through slot 60 of link member 52, whereby vertical movement of handle 38 will cause opposite vertical movement of the forward end 50 of lever 46 to force the plunger 28 outwardly from solenoid 26 to rotate rockers 30 and, hence to the brake shoes 20 to move against the urging of springs 24 to relax the pressure of the brake shoes 20 on the hoist drum 14 to allow controlled rotation of the hoist drum 14. A foot 66 is secured to the bar 34 adjacent the pivot point 44 for the link member 52 and projects downwardly to engage the upper surface 68 of the pillar 18 to provide support for the tool 10. If desired, the foot 66 may be adjustable to accommodate pillars of different dimensions, by providing an axial slot 70 in the foot 66 together with a sleeve 72 which is 72 which is slideable lenghtwise of the foot 66 and may be secured in a desired position by suitable means such as thumbscrew 74. Finally, a stop 76 may be secured to the bar 34 adjacent the pivot point 44 which attaches the handle 38 to the bar 34. The stop 76 serves to prevent the operator from getting his fingers pinched between the 38 and the bar 34 during downward movement of the handle 38. Also, as seen in FIG. 3, audio visual indicating means 78, such as a lamp, horn or the like, may be mounted in a convenient location on the elevator brake release apparatus 10 and may be connected by electrical circuit 90 to the elevator car gate switch, indicated diagrammatically indication to the operator of the elevator brake release and control apparatus 10 if the elevator car gate should become opened. If desired, set screws 51 may be provided on the forward end 36 of bar 34 and on the foot 66 to provide adjustability and to prevent slipping.

In use, the operator inserts the forward ends of the bar 34 and lever 46 between the solenoid 26 and plunger 28 of the elevator brake system 12 and rests the foot 66 on pillar 68 to support the tool 10 during the operation. Next, the operator pulls the handle 38 downward, causing bolt 64 to pull the rear end 62 of link member 52 downwardly. This causes link member 52 to pivot about pivot point 44, driving the forward end 56 upward and causing pivot point 54 to raise the rear end 58 of lever 46. This causes the lever 46 to pivot about pivot point 48 and serves to drive the forward end 50 of lever 46 downward. With bar 34 bearing against the bottom of the solenoid 26, this downward movement of the forward end 50 of lever 46 serves to drive the plunger 28 downward, which bears against rockers 30 and, hence, serves to drive the brake shoes 20 outwardly to allow the elevator hoist 14 to rotate and, thereby, to allow the elevator car, not shown, to move. Due to the compound leverage provided by handle 38, link member 52 and lever 46, the operator is able to release the elevator hoist brake 14 in a controlled manner to carefully allow the elevator car to move to a desired location, such as an adjacent floor.

Figure 2:
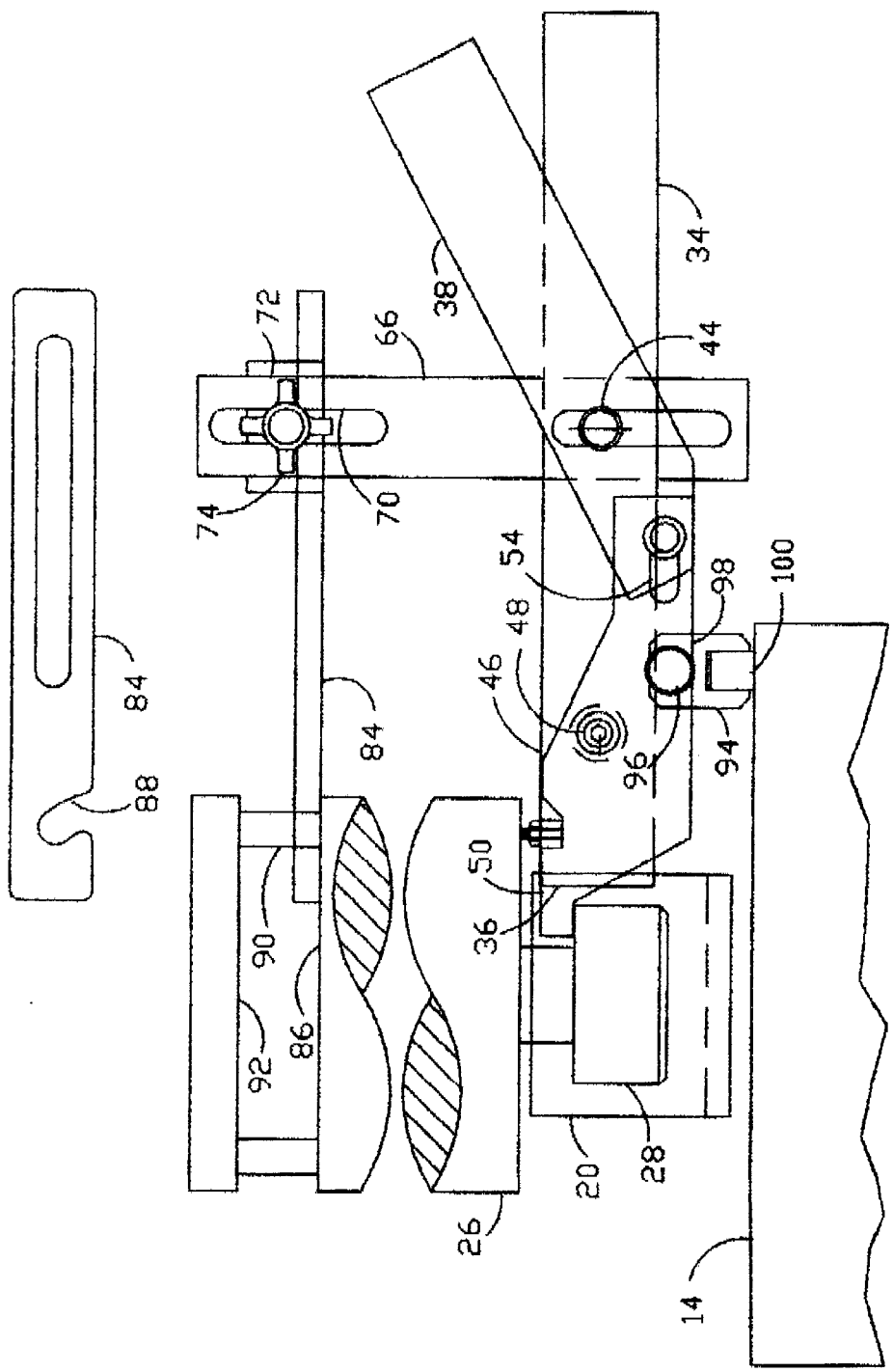
FIG. 2 is a side view showing the present invention positioned to control another type of elevator brake.
Figure 4:
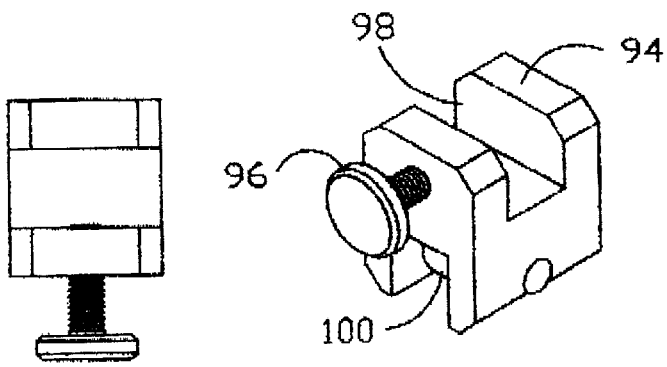
FIG. 4 is an isometric view of an adapter for use with the elevator hoist control device of the present invention to allow supporting the device of the present invention on the drum of an elevator hoist.
Figure 4:
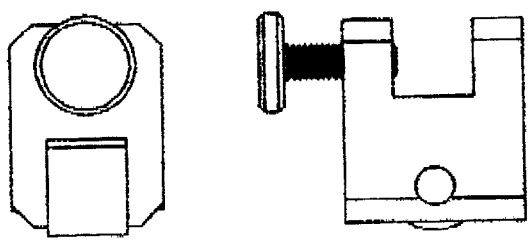

FIG. 2 shows an alternative form of the hoist control device 10 wherein the foot 66 is oriented upward and a hanger bar 84 serves to suspend the hoist control device 10 from an upper surface 86 of the hoist solenoid 26. As shown, the hanger bar 84 is formed with an axial slit 88, which slips over the end of foot 66 and has a stud 90 which engages the upper portion 92 of the solenoid 26. The hanger bar 84 is secured to the foot 66 by sleeve 72 and thumbscrew 74. Also, an adapter 94, best seen in FIG. 4, is secured to the lower surface of lever 46 by suitable means, such as thumbscrew 96. The adapter 94 has a recess 98 formed in its upper surface to receive the lever 46 and carries a wheel 100 mounted transversely on the bottom of the adapter 94 to roll freely on the brake drum 14, while supporting the hoist control device 10 of the brake drum 14.

Figure 5:
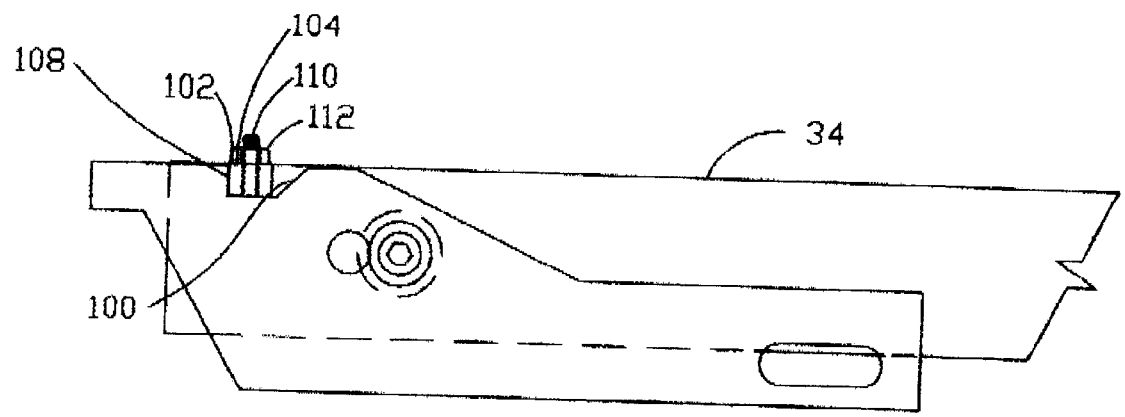
FIG. 5 is an enlarged side view of the forward end of the elevator hoist control device of FIG. 1.
Figure 6:
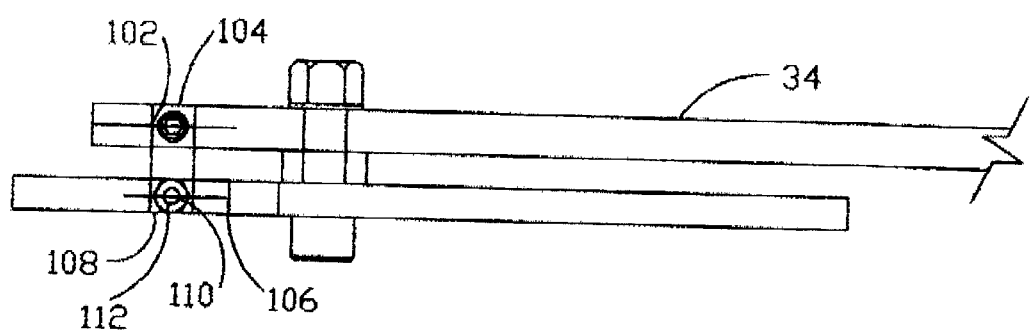
FIG. 6 is a plan view of the forward end of the elevator hoist control device of FIG. 5.

FIGS. 5 and 6 show an alternative form of the forward end of the elevator hoist control devices 10 of either FIG. 1 or FIG. 2. As shown, bar 34 is formed with a recess 102 formed adjacent the forward end 36 thereof and a crossbar 104 is mounted in recess 36 and projects laterally across lever 46, which is formed, adjacent its forward end 50, with a recess 106 to receive crossbar 104. Adjacent its outer end 108, the crossbar 104 carries a setscrew 110, which is vertically adjustable by means of nut 112. This serves to laterally steady the hoist control device 10 and to prevent wobbling of the hoist control device 10 during the hoist control operation.

Obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. Apparatus for manually releasing and controlling an elevator hoist brake having a solenoid with a vertically-actuated, flanged plunger operable to drive the brake shoes apart in opposition to brake springs which normally urge the brake shoes into the locking position, said apparatus comprising:

a bar having one end insertable between said solenoid and the flange of said plunger and engageable therewith, a handle pivotally mounted on said bar, a lever pivotally attached to said bar and having a forward end located adjacent said one end of said bar and dimensioned to be insertable between said solenoid and said flange of said plunger and engageable therewith, and compound linkage means coupling said handle to drive said lever.

2. Apparatus for manually releasing and controlling an elevator hoist brake having a solenoid with a vertically-actuated, flanged plunger operable to drive the brake shoes apart in opposition to brake springs which normally urge the brake shoes into the locking position, said apparatus comprising:

a bar having one end insertable between said solenoid and the flange of said plunger and engageable therewith, a handle having a forward end and an enlarged portion projecting downwardly adjacent said forward end which is pivotally secured to said bar at a point spaced from said one end of said bar, a lever pivotally attached to said bar and having a forward end located adjacent said one end of said bar and dimensioned to be insertable between said solenoid and said flange of said plunger and engageable therewith, a link member pivotally connected to said bar at a point spaced from the forward end of said link and from said one end of said bar and having said forward end of said link pivotally connected adjacent the rear end of said lever, said link being formed with a longitudinal slot adjacent the rear end of said link member, and a bolt fixedly secured to said handle and extending through said slot of said link member whereby vertical movement of said handle will cause opposite vertical movement of said forward end of said lever to force said plunger outwardly from said solenoid.

3. The apparatus of claim 1 further comprising:

a foot projecting downwardly from said bar to facilitate supporting said apparatus during operation.

4. The apparatus of claim 1 further comprising:

a stop mounted positioned to limit downward movement of said handle and to prevent pinching the operator's fingers between said handle and said bar.

5. The apparatus of claim 2 further comprising:

a foot projecting downwardly from said bar to facilitate supporting said apparatus during operation.

6. The apparatus of claim 2 further comprising:

a stop mounted positioned to limit downward movement of said handle and to prevent pinching the operator's fingers between said handle and said bar.

7. The apparatus of claim 1 further comprising:

audio-visual means mounted on said apparatus to to indicate the position of the car.

8. The apparatus of claim 1 further comprising:

an adapter releaseably attachable to said lever and having a wheel mounted on the underside thereof to support said apparatus on the elevator brake.

9. The apparatus of claim 5 wherein:

the length of said foot is adjustable.

10. The apparatus of claim 5 further comprising:

an axial slot formed in said foot, a sleeve slideable lengthwise of said foot, and means for releasably securing said sleeve in a desired position along said foot.

11. The apparatus of claim 1 further comprising:

a recess formed adjacent the said one of said bar, a crossbar mounted in said recess and projecting transversely across said lever, a recess formed adjacent the forward end of said lever for receiving said crossbar, and a setscrew adjustably carried by said crossbar.

12. The apparatus of claim 2 further comprising:

a recess formed adjacent said one end of said bar, a crossbar mounted in said recess and projecting transversely across said lever, a recess formed adjacent the forward end of said lever for receiving said crossbar, and a setscrew adjustably carried by said crossbar.

13. The apparatus of claim 1 further comprising:

a set screw provided adjacent said one end of said bar to provide adjustability and prevent slipping.

14. The apparatus of claim 2 further comprising:

a set screw provided adjacent said one end of said bar to provide adjustability and prevent slipping.

* * * * *